US008498810B2

(12) United States Patent
Mayer et al.

(10) Patent No.: US 8,498,810 B2
(45) Date of Patent: Jul. 30, 2013

(54) SYSTEM FOR TRANSFERRING INFORMATION FOR PERSONS IN THE AREA OF AN AIRPORT, METHOD FOR TRANSFERRING INFORMATION AND A PERSONAL END DEVICE

(75) Inventors: Pavel Mayer, Berlin (DE); Robbert Valentijn Gonggrijp, Amsterdam (NL)

(73) Assignee: Art + Com AG, Berlin (DE)

( * ) Notice: Subject to any disclaimer, the term of this patent is extended or adjusted under 35 U.S.C. 154(b) by 433 days.

(21) Appl. No.: 12/866,352

(22) PCT Filed: Jan. 29, 2009

(86) PCT No.: PCT/EP2009/051015
§ 371 (c)(1),
(2), (4) Date: Dec. 8, 2010

(87) PCT Pub. No.: WO2009/098165
PCT Pub. Date: Aug. 13, 2009

(65) Prior Publication Data
US 2011/0106445 A1 May 5, 2011

(30) Foreign Application Priority Data
Feb. 7, 2008 (DE) .................... 10 2008 008 452

(51) Int. Cl.
*G06F 19/00* (2006.01)
*G06K 7/01* (2006.01)
*H04Q 7/00* (2006.01)
(52) U.S. Cl.
USPC ........... 701/434; 701/410; 701/436; 701/437; 701/438; 701/465; 701/467; 340/572.1; 340/568.1

(58) Field of Classification Search
USPC .................. 701/400, 408, 410, 431, 433, 434, 701/436, 437, 438, 465, 467, 538; 340/539.11, 340/572.1, 567.1; 705/5; 725/81, 62; 235/375; 700/410
See application file for complete search history.

(56) References Cited

U.S. PATENT DOCUMENTS

| 2005/0029346 A1 | 2/2005 | Byrne et al. |
| 2006/0107295 A1* | 5/2006 | Margis et al. .................. 725/81 |
| 2006/0155591 A1 | 7/2006 | Altaf et al. |
| 2007/0214454 A1* | 9/2007 | Edwards et al. ............. 717/176 |
| 2007/0222595 A1 | 9/2007 | Motteram et al. |
| 2007/0273514 A1* | 11/2007 | Winand et al. ............ 340/572.1 |
| 2008/0030300 A1* | 2/2008 | Naito et al. ..................... 340/5.1 |

(Continued)

FOREIGN PATENT DOCUMENTS

| EP | 1298549 A1 | 4/2003 |
| WO | 03075216 A1 | 9/2003 |
| WO | 2005052885 A1 | 6/2005 |
| WO | 2007004047 A2 | 1/2007 |

*Primary Examiner* — Ronnie Mancho
(74) *Attorney, Agent, or Firm* — The Webb Law Firm (57) ABSTRACT

A system for transferring information for at least one person in the area of an airport, comprising a) at least one personal end device which can be worn by the at least one person, b) a detection means for detecting the current spatial position of the at least one person in the area of the airport, c) a control means for determining at least one target time for a station located along the path to a flight gate assigned to the at least one person and/or for determining a path of the at least one person from a pre-determined position to the flight gate assigned to the person.

19 Claims, 6 Drawing Sheets

U.S. PATENT DOCUMENTS

2008/0133285 A1* 6/2008 Pandya et al. .................. 705/5
2009/0008439 A1* 1/2009 Kubler et al. ................ 235/375
2009/0228908 A1* 9/2009 Margis et al. .................... 725/6
2009/0259549 A1 10/2009 Winand et al.

* cited by examiner

9 Base Stations with Overlapping Radio Cells

FIG 3B

FIG 3A lines of equal field strength and equal signal propagation time ⊙
base stations ☐
transmitting mobile station ●
attenuation or signal propagation time ●—●

Locating the Transmitter by Measuring Attenuation or Signal Propagation Time

Block Diagram of User End Device

Fig. 6

SYSTEM FOR TRANSFERRING INFORMATION FOR PERSONS IN THE AREA OF AN AIRPORT, METHOD FOR TRANSFERRING INFORMATION AND A PERSONAL END DEVICE

BACKGROUND OF THE INVENTION

1) Field of the Invention

This invention relates to a system for transferring information for persons in the area of an airport, a method for transferring information for persons in the area of an airport, and a personal end device.

2) Description of Related Art

The number of persons using airports all over the world is constantly increasing. These persons must cover distances in a complex spatial facility (in buildings and in the free space), and mostly specific deadlines must be met by these persons. Among these persons there are passengers who must move around in a complex facility under time pressure, frequently without having any local knowledge. Usually, a passenger receives a printed boarding pass and must find his way in the airport on his own. In particular, this means that he must be at a certain place, namely the flight gate, at a certain time.

However, the group of people regularly moving around in the area of an airport also includes employees working on the airport, who constantly must process new information under time pressure, e.g. to unload or refuel airplanes. In principle, these persons require up-to-the-minute information on spatially distributed points, such as flight gates.

Thus, all these persons require temporal and/or spatial information in the area of an airport. When reference is made below to the area of an airport, this does not only comprise the actual airport building, but also the runway and the surrounding places, such as car parks, loading zones or parking lots, etc.

To guide a person in the area of an airport, the passenger so far has received a boarding pass, with which he can be identified as passenger at control stations. Before boarding the aircraft, part of the boarding pass is retained or the boarding pass is read out electronically.

In particular on large airports, the route from the check-in counter to the flight gate is long and often not easy to find. How long it takes for a passenger to walk to the flight gate, often is hard to assess even for frequent flyers, and in a foreign airport virtually cannot be assessed by the passenger.

With many passengers, this uncertainty leads to increased stress and the tendency to walk to the flight gate much too early and to utilize the airport facilities for refreshment and for shopping less than would be possible or expedient. It is particularly frustrating for the passenger when departure is delayed and he must wait at the gate for an extended period.

On the other hand, other people in turn underestimate the time required to walk to the flight gate or get lost in the airport building and again and again cause delays due to late arrival at the flight gate.

Another problem consists in that passengers occasionally have to be asked to walk to certain points, for example in order to attend a special inspection of the checked luggage, receive important messages or be informed of problems with connecting flights, settle entry formalities or solve other problems.

The currently practiced method of putting out a call via the loudspeaker system is not always successful, since the acoustic perceptibility is not ensured everywhere and in particular in international traffic the pronunciation of names often is not made such that the bearer of the name feels concerned. With frequently occurring names, however, the wrong people quite frequently feel concerned.

In addition, in particular at peak times the airport experience is spoiled by various queues, for example on check-in, at the security checks and on boarding at the flight gate.

SUMMARY OF THE INVENTION

In the following, embodiments of a system and a method will be described, which should help persons in the area of an airport to move around more efficiently.

BRIEF DESCRIPTION OF THE DRAWINGS

The embodiments will be explained by way of example with reference to Figures, in which.

DETAILED DESCRIPTION OF THE PREFERRED EMBODIMENTS

Figure 1:
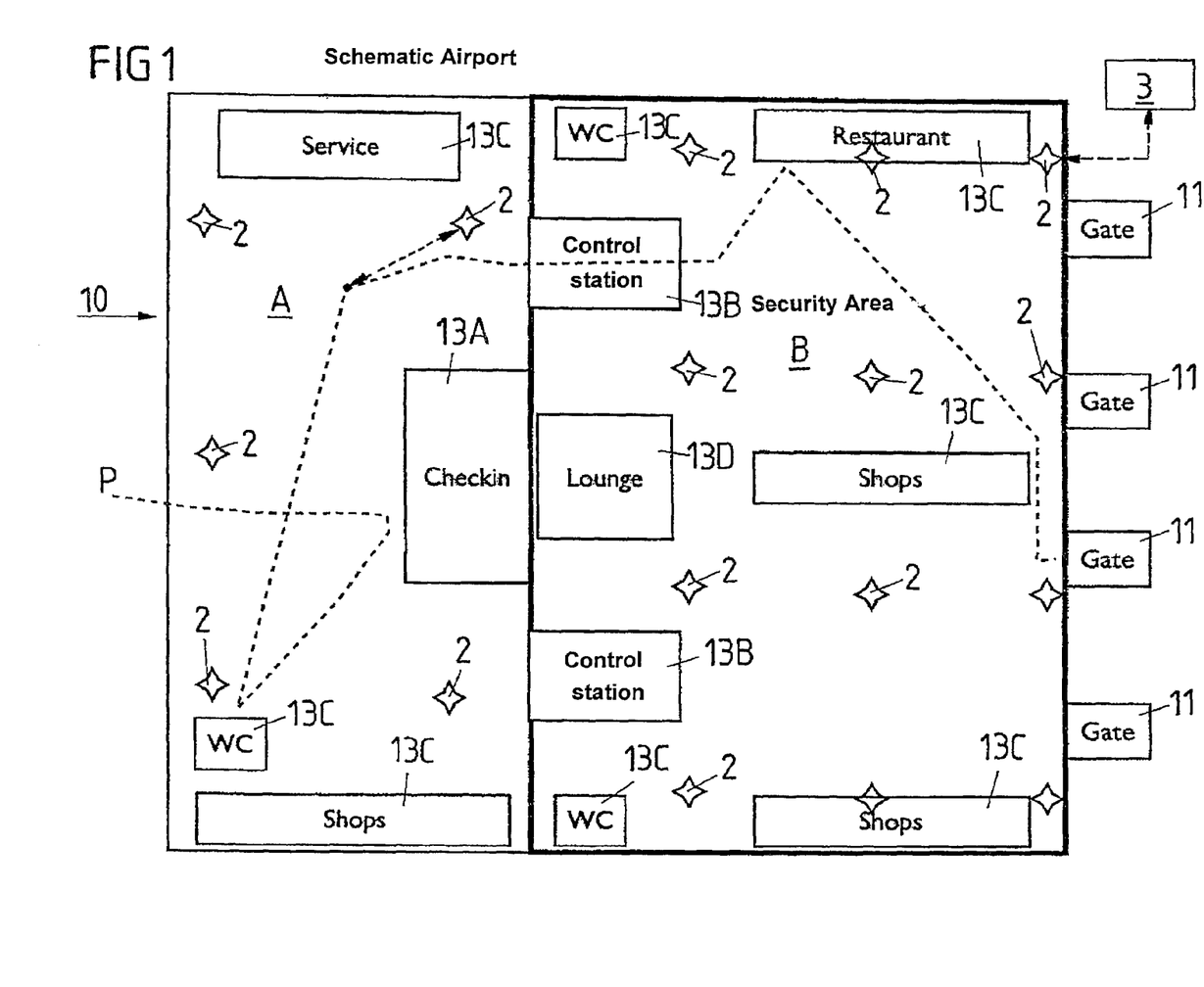
FIG. 1 shows a schematic representation of an airport by using an embodiment of the present invention.

FIG. 1 schematically shows an airport building 10 which is equipped with an embodiment of the system. For reasons of simplicity, the terrain outside the airport building 10 is not shown. As will become clear below, the present embodiments of the invention are not limited to the airport building 10.

In an airport 10, e.g. persons P must walk as passengers from several entrances via various stations to a flight gate 11. A distinction can be made between an entrance area A and a security area B. From the entrance area A, one can walk into the security area B only after certain controls at the control stations 13B. In the entrance area A, e.g. service facilities 13C such as post office, banks, restaurants, shops and sanitary facilities are arranged. In addition, the counters for the check-in of the passengers are disposed there.

In the security area B, lounges 13D for passengers and other service facilities 13C, such as sanitary facilities, shops or restaurants, are arranged.

Some stations which can lie on the route to the flight gate 11 include e.g. the check-in counter 13A, at least one luggage control 13B, possibly a passport control and a control at the flight gate 11 itself. In FIG. 1, the route of a person P from an entrance of the airport 10 to the flight gate 11 is shown by way of example. The passenger initially proceeds to the check-in counter 13A, where he receives a personal end device 1 whose design and function will be described below. The personal end device steers him to various stations in the entrance area, such as to a toilet 13C. Subsequently, the person P, steered with instructions of the personal end device, walks to a control station 13B. Subsequently, the person P can move in the security area B and again head for various stations 13, until the person finally arrives at the flight gate 11.

In the following, e.g. check-in counters 13A, control stations 13B, service facilities 13C, lounges 13D, often are simply referred to as stations 13.

Persons in transit at the airport 10 likewise must reach the flight gate 11, but follow a different route, which goes without luggage control, for example.

The common fact is that all persons P booked on a particular flight must be at a certain place (flight gate 11) at the same target time (boarding time). Here, embodiments of a system and a method intervene, which have the following features:
a) at least one portable personal end device 1 for a person P,
(b) a detection means 2 for detecting the respectively current spatial position of a person P in the area of the airport 10, and
c) a control means 3 for determining at least one target time for a station 13 on the route to a flight gate 11 assigned to the person P and/or a route for the person P from a predetermined position to the flight gate 11 assigned to the person P.

The personal end device 1 (see FIGS. 5 and 6) can constitute a portable microcomputer system with a processing unit, a display, a memory unit and/or a bidirectional radio interface.

The personal end device 1 thus can be understood as an active Boarding Guide, which can replace the passive, printed boarding passes known per se. The personal end device 1 is handed over to a passenger P e.g. on check-in and is collected again before departure at the flight gate 11. In principle, it is also possible that the personal end device 1 is also handed over to a passenger P already when booking a flight or in advance at a terminal, where the passenger proves his identity with a digital identity card, a credit card or a code. The personal end device 1 constitutes a portable device for a person P, and it can also be worn on the body.

On the job, employees of the airport 10 carry the personal end device 1 with them, so that it can also perform the function of a security pass. This will be explained in greater detail below.

The personal end device 1 includes e.g. means for personalization. These include e.g. the name of the passenger, the booked flight, the flight gate 11, the booked seat and an identification number.

Through physical proximity or direct contact, an exclusive data connection to the personal end device 1 is established at least once and at least one data record is stored in the personal end device 1 such that it cannot be changed by the user of the device. Further functions of the personal end device 1, which go beyond storing the data record, will be described below.

In the area of the airport 10, the detection means 2 includes a data radio network with spatially distributed transmitting and/or receiving stations (base stations), whose transmission/reception ranges partly overlap. In FIG. 1, corresponding base stations are shown as part of the detection means 2. By way of example, FIG. 1 shows that the personal end device 1 of a passenger P on his way to a station 13B bidirectionally communicates with a base station 2.

The base stations 2 are connected with each other and/or with a central processing unit as control means 3 such that a data exchange between the transmitting and/or receiving stations 2 and the control means 3 is possible. The network provides for a wireless bidirectional data exchange with the personal end device 1, wherein the data exchange with the personal end device is effected by means of data packets encrypted by cryptographic methods. This data network is part of the detection means 2, with which the respectively current spatial position of a personal end device 1 and hence of the corresponding person P in the area of the airport can be detected and evaluated.

In the illustrated exemplary embodiment, the radio network is configured as a picocell network with a large number of transmitting and/or receiving stations (base stations) 2, which each cover an overlapping region with a diameter of 10 to 30 m (see FIG. 2), so that on a large airport hundreds to thousands of base stations are used and it is possible to almost simultaneously communicate with ten thousands of personal end devices 1, and the transmission/reception field strengths and the power consumption of the mobile personal end devices 1 can be kept low.

Figure 2:
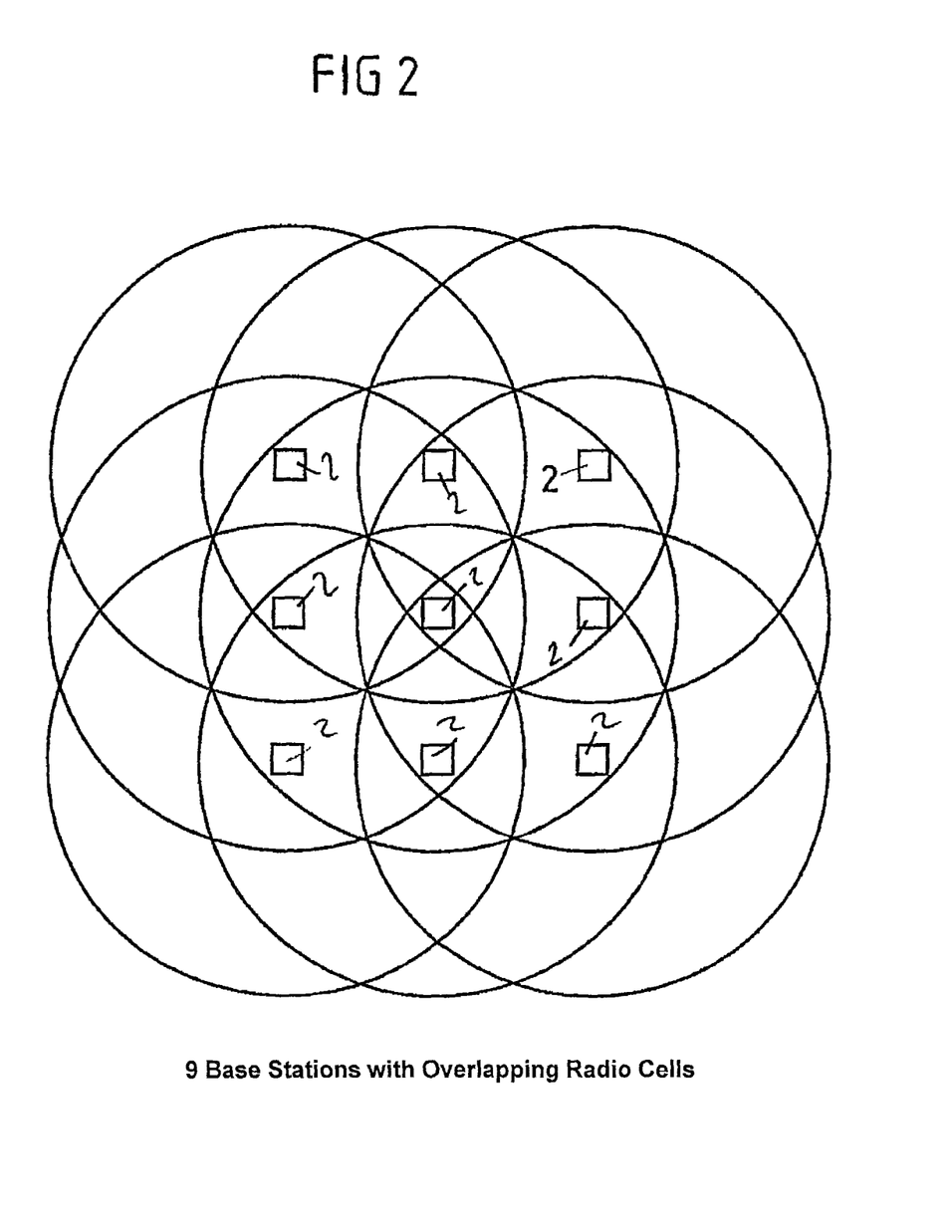
FIG. 2 shows a schematic representation of overlapping radio cells.

In one embodiment, a picocell includes a stationary transmitting/receiving station (base station 2), an antenna system and the surrounding space which is illuminated or monitored with an electromagnetic field strength sufficient for a communication. The carrier frequencies typically lie between 400 MHz and 8 GHz. The base station can communicate with other base stations via a radio link or with the entire system via a cable-bound network interface.

The detection means 2 can include software and/or hardware, which in part can be arranged on a server (e.g. as part of the control means 3) and in part on a client such as the personal end device 1. Thus, the detection means 2 is not limited to being firmly arranged at one place, but it can include stationary and movable components.

For determining at least one target time for a station 13 on the route to a flight gate 11 assigned to the person P and/or a route for the person P from a predetermined position to the flight gate 11 assigned to the person P, the control means 3 analogously can constitute software and/or hardware which includes centralized and decentralized portions. Part of the control means 3 can be a computer program which from the transmission and/or reception parameters, in particular from the transmission and/or reception field strengths of the base stations and/or of the personal end device 1 and from the known positions of the base stations determines the current spatial position of the personal end device 1.

The control means 3 is able to determine at least one target time which the passenger P must keep, in order to punctually arrive at the assigned flight gate 11. In a simple case, the flight gate 11 forms the only station 13 on the route of the passenger from his instantaneous location to the flight gate 11.

The control means 3 includes a computer program with which the required target time can be determined, which a passenger P probably needs to walk from the current (or a preselectable) location in the airport 10 to his flight gate 11, and acoustically, haptically and/or visually prompts the passenger to move to his target location, when the calculated time to arrive at the flight gate 11 falls below the remaining time to boarding plus a buffer time.

The control means 3 also contains information on the current state of delay, so that a person P is always kept informed about changes, which avoids unnecessary waiting times.

In further embodiments of the system and of the method, as will yet be described in detail below, the control means 3 also provides information which shows to the passenger when he must arrive e.g. at a station 13 (e.g. luggage control) on the route to the flight gate 11, in order to punctually arrive at the flight gate 11 in the end.

The personal end device 1 (see FIGS. 5 and 6), which is particularly configured for the described system and method, includes a display, a keyboard and/or a touch screen with which the data important for the person can be displayed. The keyboard also can include an actuator for a cursor with which particular functions can be selected in the display.

An important information on the display is the indication of the route to be covered by the person P, in order to reach the target location or at least the nearest target location.

When a person must arrive at flight gate A61 in terminal 1 of the airport 10 by 10:15 a.m., the control means 3 automatically detects that the person must pass through a number of stations 13 from the check-in (or even from the parking lot or railway station), namely first through a first hand luggage control, then through the passport control and finally through a second hand luggage control. Since the spatial position of the persons P in the area of the airport 10 is known from the detection means 2, the control means 3 can calculate how long the waiting times are at the individual stations 13. Since the control means 3 knows the current location of the person P, it can determine when the person P must start to arrive at the flight gate 11 in time. On the display of the personal end device 1 an indication as made as to the direction in which the person P must move. This can be done in the form of an arrow, such as it is known for example from a navigation system. For this purpose, one embodiment of the personal end devices 1 can contain an electronic compass, so that the personal end device 1 always knows its spatial position in the airport 10.

Via the display of the personal end device 1, the person P also obtains information as to which signs should be looked out for, and possibly information as to what should be observed before a station 3. For example, a list of forbidden objects can be displayed for the luggage control, or instructions to be observed by the person P. In this way, the employees of the airport can save considerable effort, all the more so as the information is displayed on the personal end device 1 in a language which is understood by the person P. The language selection can be set by the person himself or is made automatically on check-in.

Furthermore, it is possible that pictures are displayed to the person P, which make it simpler to move around in an airport 10, when e.g. foreign characters are used.

Via the above-mentioned radio cell network, which is part of the detection means 2, the personal end device 1 itself communicates wirelessly with the control means 3. Due to the measurement of reception field strengths and/or variable transmission field strengths and the known position of base stations 2, the location of the personal end device 1 in the region of the radio cell network can be determined from the network side or from the side of the personal end device. To increase the locating accuracy, signal propagation times can also be used.

Figure 3A:
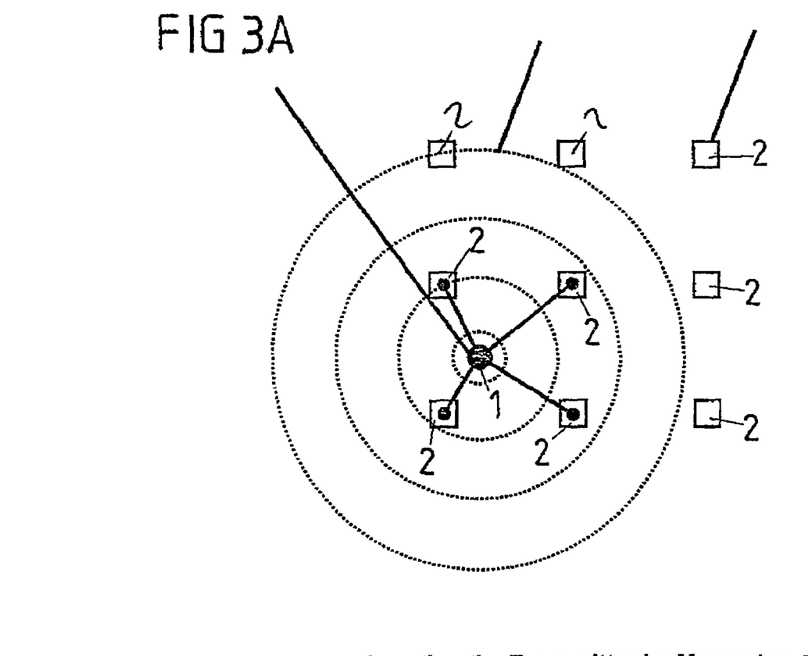
FIG. 3A shows a schematic representation of a first possibility of locating a personal end device.

In FIG. 3A, a first embodiment of a possible way of locating the personal end device is shown.

The dashed, concentric circles symbolize equal field strengths of a transmitter of a personal end device 1, which is carried e.g. by a passenger P in the airport 10. The personal end device 1 is surrounded by four base stations 2 whose distance to the personal end device 1 differs. From the different distance-dependent propagation losses of electromagnetic waves in the signal transmission between the base stations 2 and the personal end device 1, the spatial position of the personal end device can be determined by forming an average. Since the strength of electromagnetic waves decreases in proportion to the square of the distance, an imaginary spherical surface is obtained for each base station with known transmission and measured reception field strength, on which the personal end device should be disposed. By blending the corresponding spheres, a more accurate position is obtained for the mobile personal end device. The same applies when the signal propagation time is used for distance measurement.

As shown in FIG. 3A, much more base stations 2 are present, which in this exemplary case are however not used for calculating the position of the personal end device.

Figure 3B:
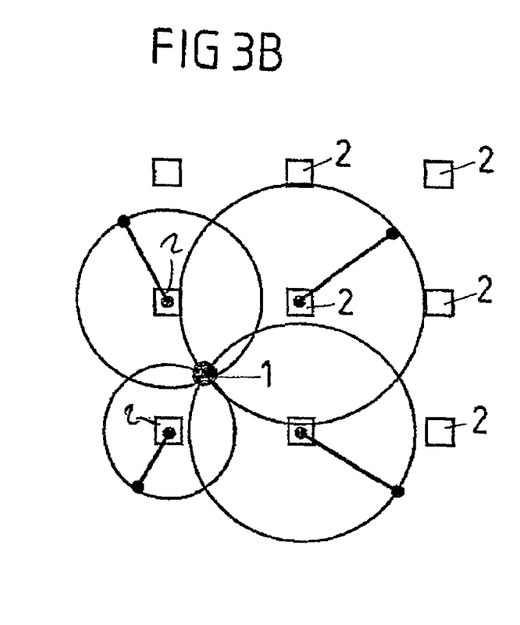
FIG. 3B shows a schematic representation of a second possibility of locating a personal end device.

In FIG. 3B another embodiment is shown, in which the signal propagation time and/or the propagation losses are measured proceeding from transmit signals from the base stations 2. In this way, too, the position of the personal end device 1 can be determined.

In principle, the embodiments shown in FIGS. 3A and 3B can also be combined with each other.

In principle, the different functionalities of the personal end device 1, which are implemented by means of computer software, can be executed both on the personal end device 1 and on firmly installed servers and be transmitted to the personal end device 1. The optimum distribution of the functionality substantially is obtained from an evaluation of resources and from the desired failure safety. Limited resources include the bandwidth of the radio network as well as the energy and hence the computing power of the personal end device. The energy, memory capacity and computing power of the stationary infrastructure on the other hand are largely scalable. On the other hand, disruptions in the central infrastructure affect all passengers P, whereas the failure of functionality accommodated in the base stations 2 is uncritical with sufficient overlap of the cells. The failure of functions of an individual personal end device 1, on the other hand, only affects an individual passenger P. In addition, the price of the personal end device 1 should be kept as low as possible, since of all system components these devices are exposed to the greatest wear and must be kept on stock in a large number.

Beside the identification and access function of the personal end device 1, the routing and scheduling of passenger movements in the airport 10 is an important function of the system and the method.

A particular embodiment acoustically represents all information, in particular the directions, with a reading means, so that even severely visually impaired or blind persons P can move around in the area of the airport 10 relatively independently. Embodiments of the system and of the method actually offer possibilities for specifically guiding persons with particular needs through the area of the airport. For example, wheelchair users are guided on routes which are particularly suitable, in that e.g. routes are calculated via elevators instead of escalators and displayed to the person P. It can also be taken into account that such persons P move slightly slower than persons without corresponding impairments.

Since the control means 3 knows the seat of the person P, one embodiment of the system and the method can be used to plan the boarding of the persons P according to zones in the aircraft, according to booking classes and/or specific needs of the person P. Thus, the movements of the persons P can be steered such that persons in particular need of help should first be at the flight gate 11, and subsequently the persons P can be steered to the flight gate 11 such that only a minimum waiting time at the flight gate 11 is obtained for each individual. This contributes to an increase of the travel comfort and to a relief of the ground staff of the airlines. By specifically steering the flows of persons to the flight gate 11, punctuality can also be increased, since e.g. signals can specifically be directed to missing or delayed persons P. Since the spatial position of the persons P in the area of the airport 10 is known, specific search measures for the person P can even be initiated, in order to prompt the person P to boarding. If the person P is on a delayed feeder flight, the control means 3 can also consider this information when steering the flows of persons in the area of the airport.

Persons P on a waiting list also can stay at any point of the airport, since the control means 3 evaluates the information on waiting lists and prompts the corresponding persons P to walk to a certain flight gate 11, when a place on the waiting list has become available.

In connection with steering the flows of passengers, additional luggage control stations 13B can be opened on the basis of the data processed by the control means 3, before too long queues can form. In the case of inevitable peaks, persons P whose boarding time is imminent or who are prioritized for other reasons will be preferred automatically in controls or passenger handling processes.

It is also possible that in one embodiment the control means 3 specifically signals to a particular person P that e.g. an inquiry at the check-in counter or a second luggage control is required.

When the personal end device 1 is set correspondingly, it can remind the person P automatically by means of an acoustic, optical and/or haptic signal (e.g. a vibration alarm) to proceed to the next target location.

If desired by the person P, a graphical map depiction can be displayed, which indicates the route over the stations 13, and at the same time the current waiting time at the stations 13 can be indicated.

Further embodiments of the system and of the method allow to provide the person P with further information on airport facilities. This can be done upon request of the person P, when the same looks e.g. for a certain shop, restaurant or a toilet. The decision as to whether the person P can take a meal in a restaurant, for example, also is facilitated by a permanently updated buffer time display, which displays the longest possible time which can still be spent at the current location, before it becomes necessary to set off for the target. Before exhaustion of the buffer time, the person P is automatically informed in time by means of an acoustic, optical and/or haptic signal that the person P should move on. In addition, an acoustic and/or haptic signal can be issued when the buffer time changes substantially due to new information (e.g. departure delays).

Furthermore, an embodiment of the personal end device 1 can be formed such that electronic games are offered to the person P. Via the display of the personal end device 1, messages in the form of text information or in audiovisual form furthermore can be offered. A radio and/or an MP3 player can also be integrated in the personal end device 1. In principle, the personal end device 1 can also have an Internet access, so that the person P e.g. can read and/or write e-mails in the area of the airport 10.

Furthermore, it is possible that the person P receives unsolicited messages e.g. as to which stations 13, in particular shops 13C or restaurants, are in the direct surroundings of the person P and what waiting times currently are to be expected in these service facilities 13C. Thus, embodiments of the system and the method allow novel advertising measures, in order to point to special offers, for example. In the shops it is even possible to automatically charge different tax rates in the duty-free area depending on the destination.

Since a person P only can board the aircraft by presenting and/or automatically reading out the personal end device 1, it is ensured that the personal end devices 1 are completely returned at the flight gates 11. When returning the personal end devices 1 a receipt with a seat information is printed out, so that the person P need not remember the seat. However, this receipt can also be issued already when handing out the personal end devices 1 or can be transmitted as short message to a mobile phone carried along.

When the personal end devices 1 are collected e.g. at the flight gate 11, software updates and/or maintenance steps can be performed in a docking cassette. Alternatively or in addition, these steps can also be made in a storage device in connection with handing out the personal end devices 1 to the persons P. In both cases it is also possible to supply the personal end devices 1 with electric energy and possibly exchange defective devices.

If a personal end device 1 gets lost, it can easily be detected by means of the detection means 2, since the position of the personal end device 1 is known. In addition, special mobile locating devices can be used, which permit an accurate location by stepwise approach and reduction of the transmission field strengths, when the mobile locating device approaches a personal end device 1.

Furthermore, the personal end devices 1 can contain movement or acceleration sensors, so that it can safely be recognized whether a device is carried or has been put down. The sensors furthermore provide for the screen display depending on the orientation of the device in space, and in addition can refine the position determination by detecting characteristic acceleration patterns, which are measurable e.g. when walking.

By evaluating the acceleration information, the personal end device also can detect whether for example a haptic or faint acoustic signal has been perceived by the carrier and in the negative case react thereto with a more obtrusive, for example louder acoustic signal.

Other embodiments of the system improve the security in the area of the airport. Thus, the system not only serves to increase the comfort of the persons P in the area of the airport 10, but also the security.

In a case of emergency, e.g. a fire, the control means 3 is able to quickly detect how many persons P are present in a danger area, so that corresponding measures can be taken. In particular, the rescue operations can be adapted to the number of persons actually endangered.

Furthermore, it is possible to provide the persons P in the danger area with information as to the direction in which the best escape routes can be found. If a person P is in acute danger, it is possible in a particular embodiment of the personal end device 1 to actuate an emergency call button, so that help can quickly be guided to the person.

Another embodiment of the system can be used to the effect that the security authorities of the airport receive information on the movements of people in the area of the airport 10 from the detection means 2. If a person P moves within an area which is blocked for a certain group of people, an alarm will be triggered. Thus, it might be detected when a person P proceeds from the entrance area A without luggage control into the security area B. After a successful control, e.g. a passport and/or luggage control, a code is automatically transmitted to the personal end device 1. Thus, it can be ensured that the aircraft is only boarded by persons P who have successfully passed through all necessary controls.

So far, embodiments have been described which show the use of the system for passengers P. Alternatively or in addition it is possible in principle to equip persons P with personal end devices 1, who work in the area of the airport 10. These personal end devices 1 generally will display other information than the personal end devices 1 for passengers P, with the devices for employees also cooperating with the detection means 2 and the control means 3. Thus, it is possible to integrate the information system with the personal end devices 1 into an employee identification system, in order to control the access of the employees to certain areas of the airport 10. Embodiments of the system can also be used in connection with an employee orientation system and/or alarm system. When e.g. an emergency is detected, the detection means 2 automatically recognizes which employees with which qualifications are around, so that swift and targeted help can be provided. Since every employee of the airport 10 wears such a device, he/she can directly be informed without announcements having to be made.

In a further embodiment of the system, the control means 3 includes a gathering means, with which certain persons P (employees and/or passengers) can gather to groups. When e.g. an employee of an airline specifically looks for a passenger, the employee can accomplish this via the detection means 2. When a group of travelers wants to come together in the airport, the control means 3 can be used to achieve that the group meets specifically (spatially and temporally). Depending on his/her current position, each member of the group receives a route and/or time indication with which the meeting is arranged.

Another embodiment of the system provides a shielding function, in which the acquisition of locating information is restricted on the network side, so that the utilization of the locating information by third parties is restricted or prevented. The same is realized in that data packets marked in advance with a particular data record are anonymized in the base stations, in that the device identification contained in the data packet is removed from the data packet or replaced by another identification. Locating by third parties thus can flexibly be prevented, which can be required for example for security reasons or reasons of employment law.

Another embodiment of the system provides that the range of the radio interface temporarily is reduced to such an extent or the device has a special data transmission interface with a very short range, so that it can be ensured with high reliability that a particular personal end device is present in an exactly determined zone. This is required for example for passing through control stations, isolation systems or the use of the device on special terminals such as the distribution and collection points or cash systems, in order to exclude a risk of confusion with personal end devices 1 of persons P spatially close to each other.

The personal end devices 1 withdrawn at collection points are introduced e.g. into collection devices which contain easily exchangeable cassettes which can hold a major number of personal end devices 1. In these cassettes, the personal end devices 1 then can already be recharged with energy. When a cassette is full, a plurality of personal end devices 1 can be withdrawn at once and be returned to the distribution points, where the devices likewise can be charged with energy. The cassettes possibly can pass through an automatic cleaning system in between, where the devices are cleaned of residues of use.

Beside the general distribution and the withdrawal of personal end devices 1 at the airport 10 an embodiment is also possible in which special personal end devices 1 are in the possession of the passengers. These special devices either can be purchased by passengers or can be made available to particular air travelers such as frequent flyers at no expense. These personal end devices 1 then can already be loaded with the corresponding flight and passenger data in advance, for example when booking via the Internet.

Furthermore, an embodiment is conceivable which utilizes existing PDAs or mobile phones and their existing radio interfaces (IEEE 802.11 WLAN, Bluetooth, GSM, UMTS), in order to realize the use as personal end device 1 in the form of software to be installed by the user or software pre-installed by the manufacturer with reloadable airport modules. Despite their general suitability, such devices like standard PDAs and mobile phones according to the present state of the art only are suitable to a limited extent for use as personal end device 1 for all passengers on a large airport in the sense of this invention.

IEEE 802.11 (WLAN) for example requires relatively much energy and badly scales with a large number of devices in a cell, as they can occur in mass use on an airport. Moreover, the transition from one radio cell to the other is problematic, since due to protocol the same only takes place upon disruption of a connection.

Bluetooth likewise does not scale sufficiently with regard to the number of possible users in a radio cell, which due to protocol are already limited to 260 users, eight of which can be active at the same time. However, the values to be achieved in practice are far below this figure.

GSM requires a relatively expensive technology in the base stations and rather is designed for large radio cells. In addition, there is a relatively low data rate, a comparatively high transmission power and the exclusive use of licensed radio frequencies, which in general have already been granted to existing licensees. A simultaneous active utilization of this existing mobile radio infrastructure by all passengers on the airport would quickly bring the system to its performance limits and thus would impair the quality of mobile radio services on the airport.

UMTS likewise requires relatively expensive base stations, but due to a lower transmission power of the mobile devices can better be restricted to small cells, allows higher data rates and can utilize the same frequencies in adjacent radio cells. Otherwise, the same problems exist as with GSM, in particular as regards the licensing of the spectrum.

Although it is possible in principle to realize a system in accordance with the invention on the basis of WLAN, Bluetooth, GSM or UMTS or a combination of these technologies, the system preferably is configured with a particularly designed pico radio cell technology. All base stations and end devices operate in the same electromagnetic radio spectrum, and data packets transmitted by the personal end devices generally are received by several base stations at the same time, whereby a more accurate location becomes possible.

Figure 4:
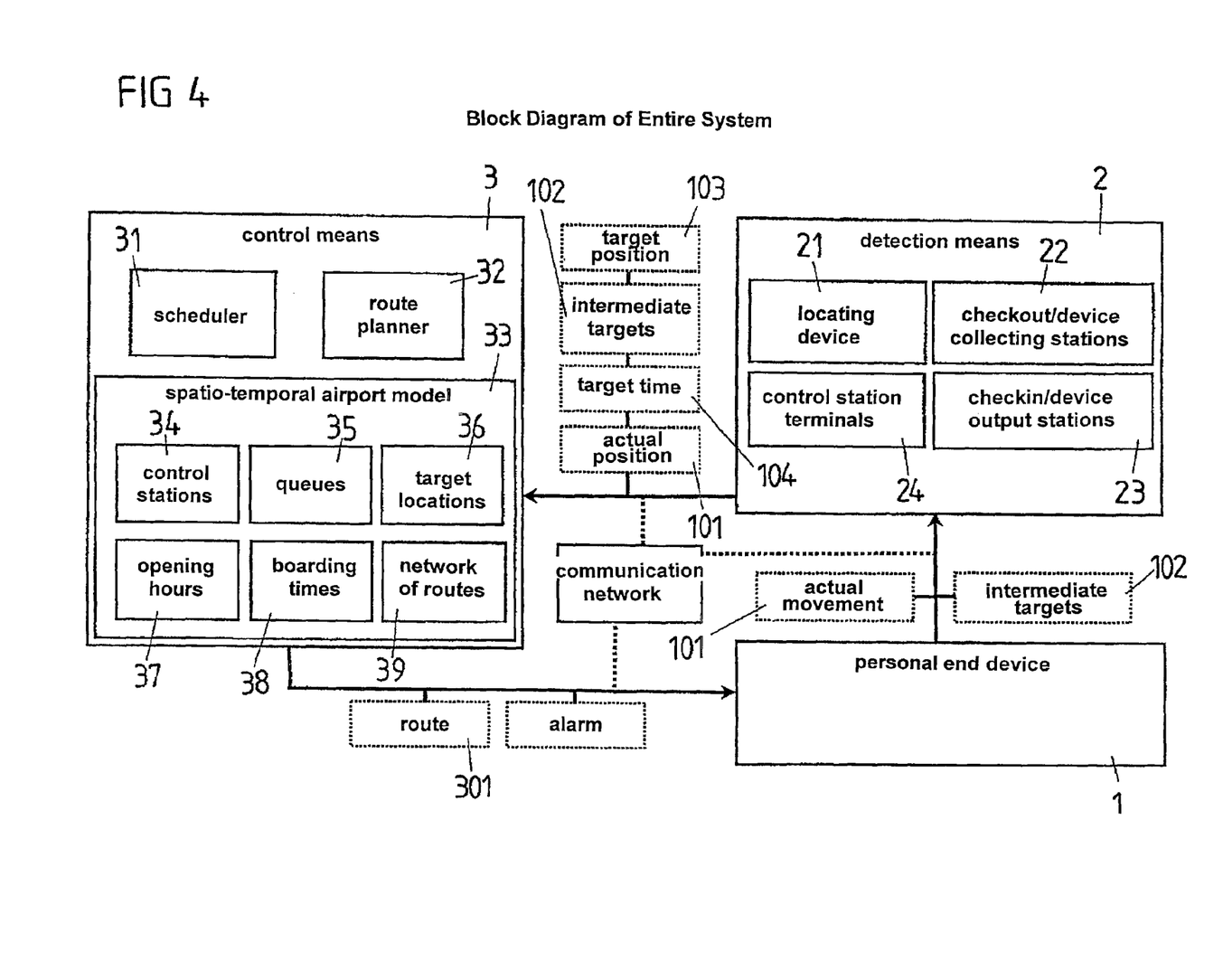
FIG. 4 shows a block circuit diagram of an embodiment of the entire system.
Figure 5:
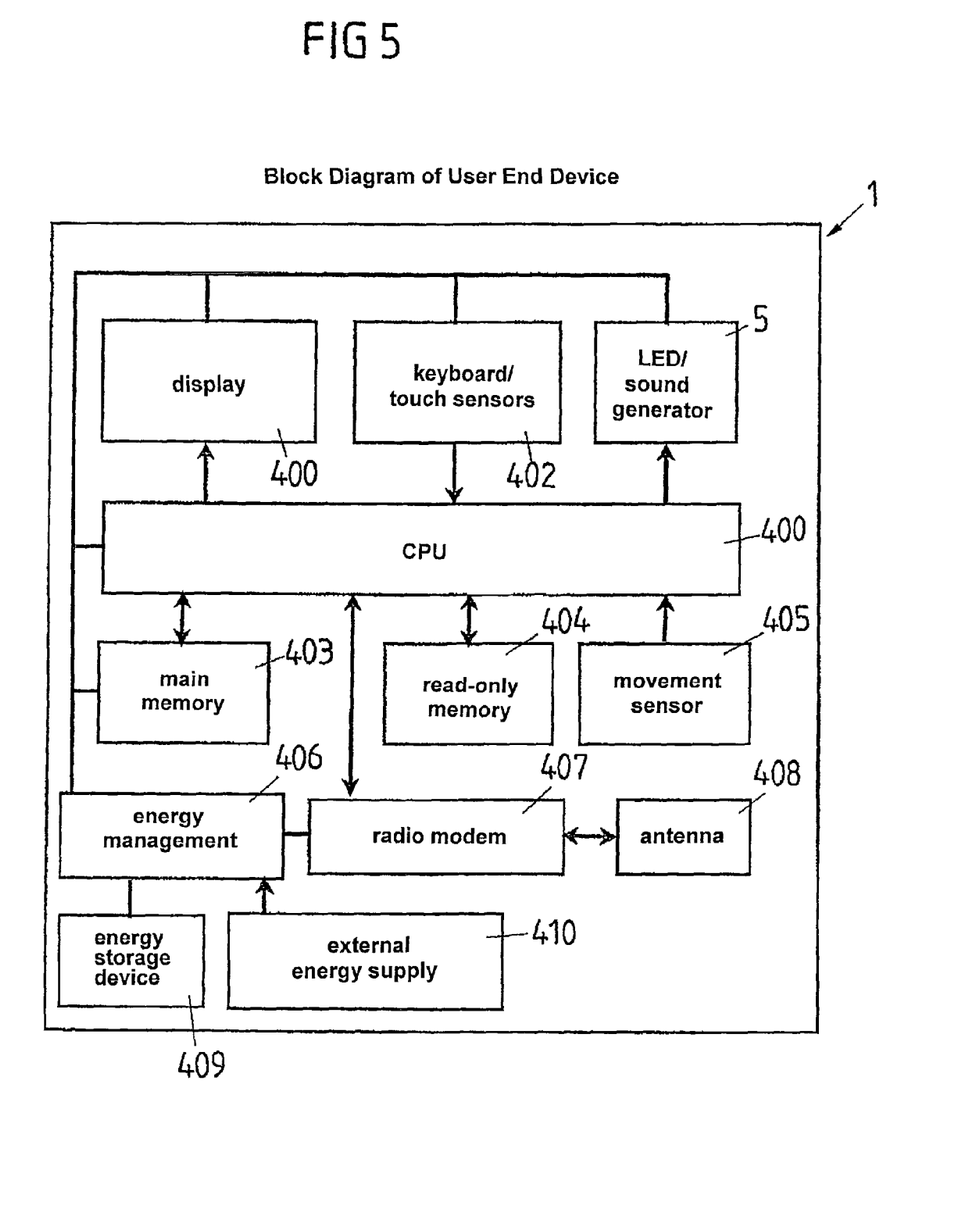
FIG. 5 shows a block circuit diagram of an embodiment of the personal end device.

In FIG. 4, the components of the system are shown in the form of a block diagram. In particular, the components of the detection means 2 and of the control means 3 are shown. The details of the personal end device are shown in FIG. 5.

Due to the method described above, the personal end device 1 knows its current position 101 in the area of the airport. Furthermore, the person P can enter desired intermediate targets 102, e.g. stations 13, which the person P wants to visit on his/her route. On check-in, the data of the flight furthermore are stored in the personal end device 1, such as the target position 103 and the target time 104.

This information is transferred to the detection means 2.

The detection means 2 establishes a contact between the personal end device 1 and the control means 3. The personal end device 1, the control means 3 and the detection means 2 can, however, also communicate with each other via another data communication network. The detection means 2 includes a location device 21. The location device 21 comprises the base stations 2 which have been described in conjunction with FIG. 2. At the same time, the detection means includes various interfaces for the personal end device 1, which are described here by way of example. On check-in, the personal end devices 1 are handed out, so that here an allocation is made between a personal end device 1 and a person P at a device distribution station 23. This can also include the exchange of identification features, such as pictures or biometric data, which make it easier for the staff of the airport to allow an unambiguous allocation of the personal end device 1 to the person P.

A further examination and/or allocation then is effected in connection with a control station 13B. The detection means 2 is coupled with control terminals 24, in order to collect the data of the person. This not only contributes to security, but also serves to detect the flows of persons in the airport.

Finally, the person P reaches the flight gate 11. At the collection point of the personal end device 1, device collecting stations 22 are disposed, which read out the personal end devices 1, possible reconfigure and test the same. The person end devices 1 then are delivered back to the check-in counters 13A.

In principle, the detection means 2 can also be coupled with further units in the area of the airport 10.

Thus, the detection means 2 can detect the target position 103, the intermediate targets 102, the target time 104 and the actual position 101 of the personal end devices 1 at any time and transmit the same to the control means.

These data now are related with the current and prestored data of the control means 3.

In the illustrated embodiment, the control means 3 includes means for route planning 31 and time planning 32. The means for time planning comprises a scheduling means with which certain deadlines and the compliance with the same can be detected. The means for route planning 33 includes e.g. means for determining the shortest or fastest route between two points in the area of the airport 10. Other marginal conditions can also be entered, such as the consideration of routes suitable for handicapped people. The means for route planning 32 also is coupled with a database of a spatio-temporal airport model 33, in which e.g. service facilities are stored with their spatial and temporal data (opening hours).

In the illustrated embodiment, the spatio-temporal airport model 33 includes a number of databases which contain e.g. the status of the stations 13 (in particular luggage and passport controls). Furthermore, the spatio-temporal airport model includes data concerning queues 35, the status information at the target locations 36, i.e. the flight gates 11, a database of the opening hours 37, a database of the current and scheduled boarding times 38, and information on the current network of routes 39.

From this enumeration it is clear that the information content of the spatio-temporal airport model 33 is not limited to these data. Rather, in particular all visual and/or acoustic data can be stored, which allow a person to efficiently move around in the area of the airport 10. In particular, the same also include information in various languages.

As a result, a route 301 is transmitted with time information to the personal end device 1. Possibly, alarm messages 302 are also transmitted to the personal end device 1, when e.g. a jam at the luggage control is to be expected due to the utilization of the airport 10. Hence, the system not only is a navigation system for finding a route, but also an observation system which enables a person P to behave in a timely manner. Since the information is distributed to all passengers, the passengers can be steered better through the airport as a whole.

In FIG. 5, an embodiment of a personal end device 1 is shown in the form of a block diagram.

The personal end device 1 includes a display 400 and a keyboard 401, which can be configured e.g. in the form of a touch screen. A further interface to the person P is a sound generator 5, a vibrator circuit and/or a light signal system, in order to signal e.g. incoming information to the person.

These interfaces are coupled with a CPU, which loads the data from the interfaces or transmits data to the interfaces.

Furthermore the personal end device 1 includes a main memory 403 and a read-only memory 404, in which incoming data and prestored data can be stored.

A movement sensor 405 can detect in which direction and/or with which acceleration the personal end device 1 moves. From these movement parameters, the personal end device 1 can obtain further information on its position.

The data exchange with the detection means 2 is effected via an antenna 408 which is coupled with a radio modem 407.

For energy supply, the personal end device 1 includes an energy storage device 408 in the form of an accumulator or batteries.

The energy management 406 is performed by a circuitry and/or a corresponding software. The energy management 406 also controls the energy supply 410, when e.g. the personal end devices 1 are charged.

Figure 6:
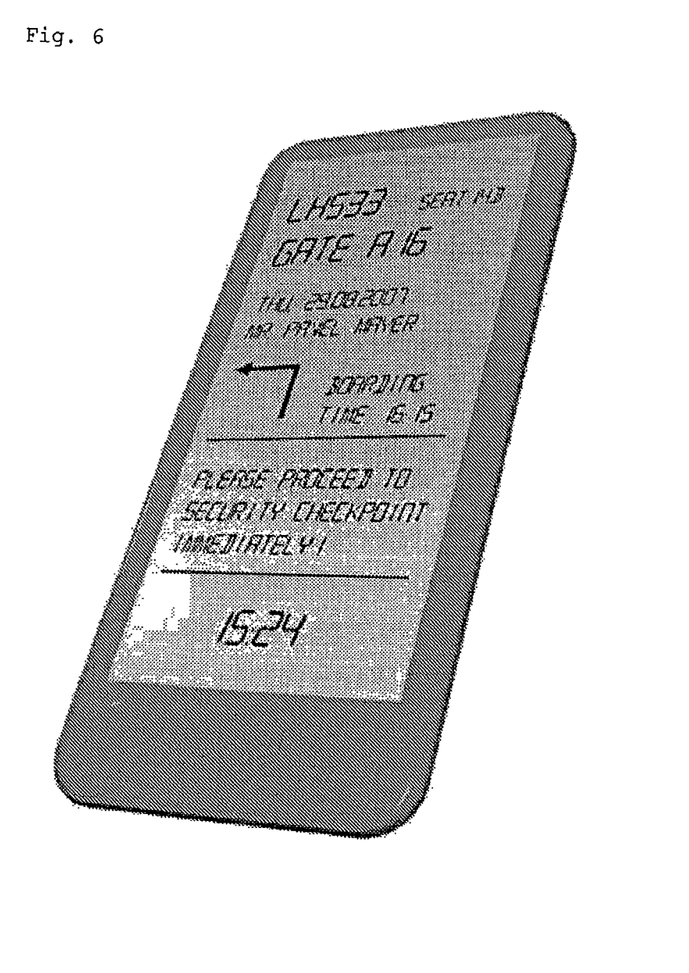
FIG. 6 shows a three-dimensional view of an embodiment of a personal end device.

In FIG. 6 it can be seen that the person P is alarmed (Boarding Time 16:15) to perform a certain action, and the person P receives instructions of how to behave, i.e. where to proceed. Furthermore, the display shows the flight number (LH533), the seat (Seat 14B), the flight gate (A16), date and name.

The skilled person will recognize that the features of the described embodiments can be combined with each other, so that a particular embodiment need not include all features which have been described above. Rather, it is possible to develop embodiments which only make use of part of the features.

The invention claimed is:

1. A system for transferring information for at least one person in an area of an airport, comprising
    a) at least one personal end device which can be carried by the at least one person;
    b) a detection means for detecting the respectively current spatial position of the at least one person in the area of the airport; and
    c) a control means for determining at least one target time for a station on a route to a flight gate, which is assigned to the at least one person, and/or for determining a route of the at least one person from a predetermined position to the flight gate assigned to the at least one person.

2. The system according to claim 1, wherein the detection means collects data on the frequentation of stations on the route to the flight gate and automatically considers these data when determining the at least one target time and/or the route for the at least one person.

3. The system according to claim 2, wherein the frequentation data of stations on the route to the flight gate are evaluated by the detection means, in order to provide information to the at least one person, so that several persons are guided to the flight gate in a timed manner according to a predeterminable schedule.

4. The system according to claim 1, further comprising an information means for providing temporal and/or spatial information for the at least one person, in order to reach other airport facilities.

5. The system according to claim 1, wherein the at least one personal end device includes at least one signaling means for the at least one person.

6. The system according to claim 5, wherein the signaling means generates at least one acoustic signal, optical signal, tactile signal, or any combination thereof.

7. The system according to claim 1, wherein the control means includes a gathering means with which information is generated, so that at least two persons can spatially be brought together within the area of the airport according to predeterminable criteria.

8. The system according to claim 1, wherein the detection means includes overlapping radio cells for data exchange.

9. The system according to claim 1, wherein the detection system includes at least one pico radio cell network.

10. The system according to claim 1, further comprising an interface with at least one of a booking system and a clearance system.

11. The system according to claim 1, wherein the at least one personal end device includes at least one collecting means.

12. The system according to claim 1, wherein the detection means specifically issues a signal to persons in the area of the airport according to predetermined features.

13. The system according to claim 1, wherein the detection means automatically generates a signal when the at least one personal end device leaves a predetermined spatial area or is detected in a predetermined spatial area.

14. The system according to claim 1, wherein the at least one personal end device includes a means for access authorization for certain areas in the area of the airport.

15. The system according to claim 1, further comprising means for evaluating a position of persons in the area of the airport for security measures, flows of persons in the area of the airport for security measures, or any combination thereof.

16. A method for transferring information for at least one person in an area of an airport, comprising:
providing at least one personal end device to the at least one person which can be carried by the at least one person;
detecting with a detection means a current spatial position of the at least one person in the area of the airport; and
determining with a control means, in dependence on data collected by the detection means, at least one target time for a station on a route to a flight gate assigned to the at least one person and/or a route for the at least one person from a predetermined position to the flight gate assigned to the at least one person.

17. A personal end device formed for use in the system according to claim 1, the personal end device comprising a computer device for establishing a connection to a computer network.

18. The personal end device according to claim 17, further comprising a display, a keyboard, a joystick, a touch screen, a radio, a television, an Internet Client, or any combination thereof.

19. The personal end device according to claim 17, wherein at least part of information determined for the at least one person is automatically reproduced acoustically by a reading means.

* * * * *

UNITED STATES PATENT AND TRADEMARK OFFICE
CERTIFICATE OF CORRECTION

PATENT NO. : 8,498,810 B2  Page 1 of 1
APPLICATION NO. : 12/866352
DATED : July 30, 2013
INVENTOR(S) : Mayer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this
Fifteenth Day of September, 2015

Michelle K. Lee
*Director of the United States Patent and Trademark Office*